T. P. BOLGER.
FLOWER BOX.
APPLICATION FILED MAR. 31, 1915.
1,170,402.  Patented Feb. 1, 1916.
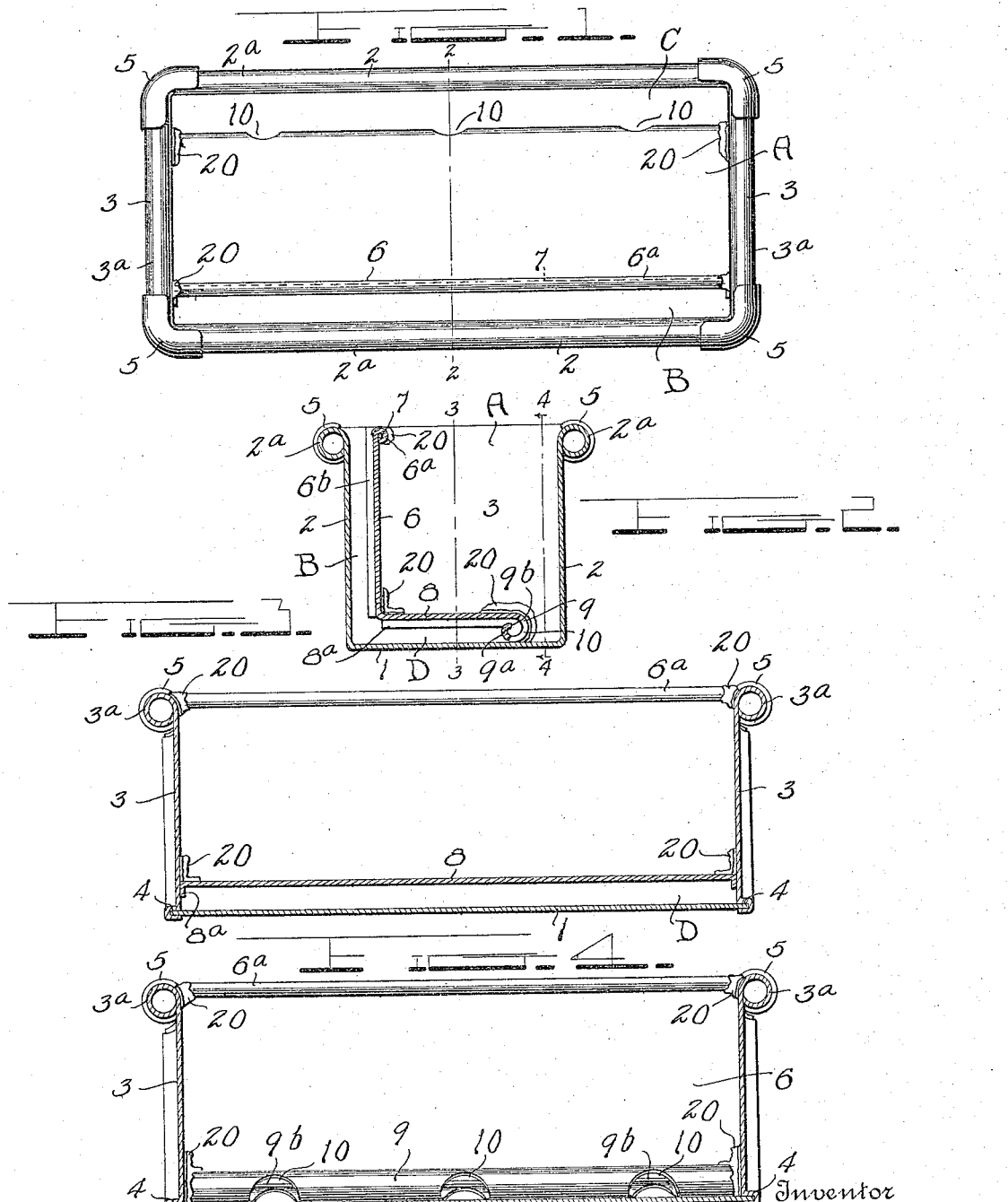

UNITED STATES PATENT OFFICE.

THOMAS P. BOLGER, OF GLOUCESTER, MASSACHUSETTS.

FLOWER-BOX.

1,170,402.  Specification of Letters Patent.  Patented Feb. 1, 1916.

Application filed March 31, 1915. Serial No. 18,356.

*To all whom it may concern:*

Be it known that I, THOMAS P. BOLGER, a citizen of the United States, residing at Gloucester, in the county of Essex and State of Massachusetts, have invented certain new and useful Improvements in Flower-Boxes, of which the following is a specification.

The present invention relates to certain new and useful improvements in flower boxes, and has for its object to provide a device of this character which embodies novel features of construction whereby a water tight bottom is provided and at the same time ample provision is made for proper drainage of the soil and a circulation of air underneath the plants such as will prevent the soil from becoming sour and soggy.

Further objects of the invention are to provide a flower box of this character which is comparatively simple and inexpensive in its construction, which can be placed in a wicker basket or the like and watered from the top, which can be safely placed upon a table or porch without danger of the woodwork being soiled and discolored by drippings, and which provides in a satisfactory manner for the drainage of the soil and the circulation of air underneath the plants.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a flower box constructed in accordance with the invention. Fig. 2 is a transverse vertical sectional view through the same on the line 2—2 of Fig. 1. Fig. 3 is a longitudinal sectional view through the flower box on the line 3—3 of Fig. 2. Fig. 4 is a similar view on the line 4—4 of Fig. 2, looking in the direction of the arrows.

Corresponding and like parts are referred to in the following description and indicated in all the views of the drawings by the same reference characters.

Specifically describing the present embodiment of the invention, the numeral 1 designates the bottom of the box which is flat and imperforate, and 2 sides which project upwardly from the edges of the bottom and may be integral therewith, both the sides and bottom being preferably formed from a single piece of sheet material. The ends 3 of the box are suitably connected by watertight joints to the edges of the bottom 1 and sides 2. For this purpose the ends 3 are shown as having the edges thereof bent rearwardly and forwardly to provide channels 4 which receive the bottom and sides. If desired, solder may be applied to these joints to render them water-tight. At the top of the box the upper edges of the sides 2 are rolled outwardly at $2^a$ to provide a tubular reinforcing rib and handle extending the full length thereof. In a similar manner the upper edges of the ends 3 are rolled outwardly as indicated at $3^a$, the tubular reinforcing ribs and handles $2^a$ and $3^a$ being suitably connected at the corners of the box by elbow members 5. In this manner the upper edge of the box is strongly reinforced so that there is no danger of the sides and ends being bent out of shape or distorted, and at the same time a means is provided for handling the flower box, since the tubular reinforcing rolls $2^a$ and $3^a$ are of a sufficient size to be readily grasped by the hands.

The box is shown as having an elongated formation, and an interior partition 6 which is slightly spaced from one of the sides 2 and has a substantially parallel relation thereto extends downwardly from the top of the box to a point near the bottom thereof. The upper edge of this interior partition 6 is returned at $6^a$ and may be provided with a reinforcing wire 7 so that there will be no danger of the partition being caused to bulge by the side pressure of the soil, or of being accidentally knocked out of shape. The provision of the partition 6 divides the interior of the box into a large soil compartment A, and a narrow watering channel B extending the full length of the box at one side thereof and leading from the top of the box to the bottom thereof.

A false bottom 8 extends over a portion of the bottom of the soil compartment A, one edge of the said false bottom meeting the lower edge of the interior partition 6, and being shown in the present instance as integral therewith, while the opposite edge thereof is extended or rolled downwardly to provide the curved flange 9 which has a spaced and substantially parallel relation to the side 2 of the box and rests firmly upon the bottom of the box, a narrow drainage channel C which extends the full length of the box being provided between the side 2 and the curved flange 9. A series of drain openings 10 are provided in the curved flange 9 and lead from one side of the drainage channel C to a drainage and water supply compartment or reservoir provided between the bottom 1 and the false bottom 8. The lower edge of the curved and downwardly extending flange 9 is bent or extended upwardly at $9^a$ to provide a reinforcing rib for the lower edge of the flange, as well as a baffle plate which is arranged opposite the drain openings 6 so as to prevent soil from being washed into the drainage compartment or water reservoir D. The edge of the upwardly extending reinforcing flange $9^a$ is also returned at $9^b$ so as to provide as rigid a construction as possible. With such a construction there is no necessity of soldering or riveting the lower edge of the flange 9 to the bottom 1, since the flange is sufficiently rigid to withstand ordinary rough usage, and it is merely necessary to secure the ends thereof and the ends of the false bottom 8 to the ends 3 of the box.

The ends of the interior partition 6 are bent laterally at $6^b$ so as to provide end flanges which fit squarely against the ends 3 of the box, said flanges being soldered or otherwise rigidly connected thereto. In a similar manner, the ends of the false bottom 8 are extended downwardly at $8^a$ to provide flanges which fit against the ends 3 of the box and are soldered or otherwise rigidly connected thereto. The interior partition 6 and false bottom 8 may thus be easily secured in position within the flower box and these two elements, together with the downwardly extending curved flange 9 may be conveniently and inexpensively formed from a single piece of sheet material.

In the use of the box the large compartment A is filled with soil and flowers planted therein in the usual manner. Should water be applied to the top of the soil, it will percolate downwardly through the same into the longitudinal drainage channel or depression at one side of the bottom of the soil compartment and then pass through the drain openings 10 into the drainage compartment D which is provided between the bottom 1 and false bottom 8. On the other hand, should it be desired to supply water to the soil from the bottom of the box, water may be poured through the watering channel B at one side of the box into the water reservoir and drainage compartment D, from which it will flow through the drain openings 10 and percolate upwardly through the soil so as to supply water to the soil, as required. The drainage compartment and water reservoir D is in communication with the atmosphere through the watering channel B so that provision is made for obtaining a circulation of air under the soil and water will not stand in the compartment D sufficiently long to become stagnant, owing to the fact that it will either evaporate or be taken up by the soil. As previously explained the upwardly extending reinforcing rib $9^a$ of the curved flange 9 operates as a baffle member to prevent any appreciable amount of the soil from being washed from the soil compartment A into the drainage compartment D under the false bottom 8. The bottom and sides of the box are absolutely water-tight so that it can be placed in a wicker basket or used upon a table or porch without danger of the member upon which it is placed being stained and discolored by the drippings therefrom. The side watering channel B provides for watering the plants from the bottom thereof, and also enables good drainage to be obtained, as well as a circulation of air underneath the plants. The soil is thus prevented from becoming foul and soggy and healthy plants can be grown without difficulty.

The upright partition 6 and false bottom 8 may be secured in position within the flower box in any suitable manner, although in the present instance they are shown as attached at intervals by means of solder, as indicated at 20. The edges of the partition 6 and false bottom 8 fit against the ends of the flower box so as to effectively confine the soil within the soil compartment A, although any surplus water within the soil can readily seep around the edges of the partition and false bottom between the points where the solder is applied.

Having thus described the invention, what I claim as new and desire to secure by Letters Patent, is:—

1. A flower box including an elongated substantially rectangular flower box having an open top and formed with water-tight sides and bottom, a longitudinally extending upright partition having a slightly spaced and substantially parallel relation to one of the sides of the box and terminating short of the bottom thereof, said partition providing a comparatively narrow air space and watering channel extending the full length of the box and leading from the top to the bottom thereof, and a false bottom extending the full length of the box and spaced from the bottom thereof to provide an air space and drainage compartment extending under the full length of the soil compartment, the edge of the false bottom being secured to the lower edge of the upright partition so that the watering channel and drainage compartment communicate with each other throughout the entire length of the box.

2. A flower box including an elongated substantially rectangular box having an open top and formed with water tight sides and bottom, an upright partition extending the full length of the box and having a slightly spaced and parallel relation to one of the sides so as to provide a large soil compartment and a comparatively narrow watering channel extending the full length of the box and leading from the top to the bottom thereof, a false bottom extending the full length of the box and spaced from the bottom thereof so as to provide a drainage compartment extending under the full length of the soil compartment and communicating with the upright watering channel, one edge of the false bottom being secured to the upper edge of the upright partition, while the opposite edge thereof terminates at a point spaced from the opposite side of the box, and a downwardly extending flange projecting from the said opposite edge of the false bottom, a longitudinally disposed drainage depression being provided at the bottom of the soil compartment between the flange and the box.

3. A flower box including a box having water-tight bottom and sides, an upright partition slightly spaced from one side of the box and providing a watering channel leading from the top to the bottom of the box, a false bottom spaced from the bottom of the box to provide a drainage compartment, said false bottom extending from the lower edge of the upright partition to a point spaced from the opposite side of the box, and a downwardly extending flange projecting from the edge of the false bottom to the bottom of the box and having drain openings therein, said flange having the lower edge thereof returned upwardly to provide a combined reinforcing rib and baffle member extending across the drain openings.

4. A flower box including an elongated water tight box having a bottom and opposed upright sides, an upright partition having a slightly spaced and substantially parallel relation to one of the sides so as to provide a comparatively large soil compartment and a narrow watering channel extending the full length of the box and leading from the top to the bottom thereof, a false bottom spaced from the main bottom of the box so as to provide a drainage compartment which extends under the soil compartment and communicates with the watering channel, said false bottom leading from the lower edge of the upright partition to a point spaced from the opposite side of the box, and a downwardly extending flange projecting from the edge of the false bottom and engaging the main bottom so as to provide a longitudinally extending drainage depression between the flange and the side of the box, the said flange being provided with a series of drain openings.

5. A flower box including an elongated water-tight box formed with a bottom and opposed upright sides, an upright partition having a slightly spaced and substantially parallel relation to one of the sides so as to provide a large soil compartment and a comparatively narrow watering channel extending the full length of the box and leading from the top to the bottom thereof, a false bottom spaced from the bottom of the box so as to provide a drainage compartment extending under the soil compartment, said false bottom leading from the lower edge of the upright partition to a point spaced from the opposite side of the box, and a downwardly extending flange projecting from the edge of the false bottom and engaging the main bottom, said flange being provided with a series of drain openings and having the lower edge thereof extended upwardly to provide a combined reinforcing rib and baffle member for the drain openings, a longitudinally disposed drainage depression being provided at the bottom of the soil compartment between the flange and the side of the box.

In testimony whereof I affix my signature in presence of two witnesses.

THOMAS P. BOLGER.

Witnesses:
 ARTHUR J. GRIMES,
 K. W. McVARISH.